(12) United States Patent
Morita

(10) Patent No.: US 7,787,662 B2
(45) Date of Patent: Aug. 31, 2010

(54) INFORMATION PROCESSING SYSTEM, INFORMATION PROCESSING APPARATUS AND METHOD, AND PROGRAM

(75) Inventor: Tadashi Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 1015 days.

(21) Appl. No.: 11/475,987

(22) Filed: Jun. 28, 2006

(65) Prior Publication Data

US 2007/0098224 A1 May 3, 2007

(30) Foreign Application Priority Data

Jul. 4, 2005 (JP) .............................. P2005-195443

(51) Int. Cl.
*G06K 9/00* (2006.01)
(52) U.S. Cl. ...................... 382/115; 235/379; 235/380; 382/209; 713/183
(58) Field of Classification Search ................. 235/375, 235/379, 380; 382/115, 116, 117, 124, 209
See application file for complete search history.

(56) References Cited

U.S. PATENT DOCUMENTS

| | | | |
|---|---|---|---|
| 6,796,496 B2 * | 9/2004 | Andersen et al. ............ | 235/380 |
| 7,278,024 B2 * | 10/2007 | Sundararajan et al. ...... | 713/183 |
| 7,447,772 B2 * | 11/2008 | Natsuno et al. ............. | 709/225 |
| 2003/0154406 A1 * | 8/2003 | Honarvar et al. ............ | 713/201 |
| 2003/0209599 A1 * | 11/2003 | Gatto ......................... | 235/379 |
| 2004/0010597 A1 * | 1/2004 | Kirschner et al. ........... | 709/228 |
| 2004/0179692 A1 * | 9/2004 | Cheng ........................ | 380/278 |

FOREIGN PATENT DOCUMENTS

| | | |
|---|---|---|
| EP | 0 750 283 A1 | 12/1996 |
| GB | 2 397 678 A | 7/2004 |
| JP | 2001-076068 A | 3/2001 |
| JP | 2001-117873 A | 4/2001 |
| JP | 2004-199701 A | 7/2004 |
| WO | WO-95/24690 A1 | 9/1995 |
| WO | WO-00/10125 A1 | 2/2000 |

OTHER PUBLICATIONS

Japanese Office Action issued Jun. 4, 2009 for corresponding Japanese Application No. 2005-195443.
English Text Translation of Chinese Office Action issued Mar. 27, 2009 for corresponding Chinese Application No. 200610115629.6.
Original Chinese Office Action issued Mar. 29, 2009 for corresponding Chinese Application No. 200610115629.6 the translation of which was supplied Jul. 23, 2009.

* cited by examiner

*Primary Examiner*—Gregory M Desire
(74) *Attorney, Agent, or Firm*—Rader, Fishman & Grauer PLLC

(57) ABSTRACT

An information processing apparatus includes acquiring means for acquiring setting information arbitrarily set by a user and stored in another apparatus, display controlling means for controlling display of the acquired setting information on a screen, authenticating means for, when the setting information displayed on the screen is indicated to be valid by an operation performed by the user, authenticating whether or not the user is valid, and processing means for, when the user has been authenticated to be valid, executing predetermined processing operated by the user.

7 Claims, 11 Drawing Sheets

INFORMATION PROCESSING SYSTEM, INFORMATION PROCESSING APPARATUS AND METHOD, AND PROGRAM

CROSS REFERENCES TO RELATED APPLICATIONS

The present invention contains subject matter related to Japanese Patent Application JP 2005-195443 filed in the Japanese Patent Office on Jul. 4, 2005, the entire contents of which are incorporated herein by reference.

BACKGROUND OF THE INVENTION

1. Field of the Invention

The present invention relates to information processing systems, information processing apparatuses and methods, and programs and, in particular, to an information processing system, an information processing apparatus, an information processing method, and a program which can prevent leakage of personal information of users.

2. Description of the Related Art

Recently, the use of IC (Integrated Circuit) cards which contain IC chips therein has become widespread. The IC cards have higher functions and security capabilities than other cards such as magnetic cards, and therefore have been used in the financial industry and the credit card industry for the purpose of prevention of losses due to counterfeit cards.

In addition, automatic teller machines (ATMs) capable of handling these IC cards have also become widely available. Using these ATMs, users of IC cards carry out transactions such as deposit, withdrawal, transfer, and balance inquiry.

For example, Japanese Unexamined Patent Application Publication No. 2004-199701 describes a system for IC cards and ATMs. In this system, a sensor module has a sensor for biometric measurement, and a computer retains biometric data of a user as information indicating that the user has authorization corresponding to a request from the user. The biometric data is encrypted by a log-on personal identification number (PIN) of the user, and it is decrypted when the request and the log-on PIN are input. The decrypted biometric data and measurement information measured by the sensor are compared. When the user and the authorization of the user are verified based on the result of the comparison, a notification of the execution of the user request is output.

However, in the use of IC cards, there is a possibility that personal information of a user is leaked to a third party if the user uses an ATM which is counterfeited. For example, when the user inserts an IC card into an ATM, he or she inputs a PIN in response to a prompt of PIN input. In this system, however, if the ATM is a counterfeit, input personal information can be stolen after user's PIN or biometric information is input, by pretending that the ATM is broken.

Moreover, a user verification system described in Japanese Unexamined Patent Application Publication No. 2004-199701 employs a scheme in which biometric information is encrypted using a PIN so as to prevent theft of biometric information. However, this scheme is employed on the premise that the terminal used for authenticating the biometric information is reliable. Therefore, it involves a risk of leakage of user's personal information in the case where the terminal to be used is a counterfeit.

In addition, generally, it is highly likely that a user uses the same PIN for multiple cards which he or she possesses. Thus, once the personal information of the user is leaked, for example, his or her internet banking account can be accessed by a third party using the leaked PIN without authorization.

Further, biometric information (physical or behavioral characteristics) cannot be changed. Therefore, once biometric information is leaked, it is also likely that the biometric information becomes unusable for authenticating the user.

SUMMARY OF THE INVENTION

The present invention has been made in view of the above circumstances and accordingly configured to prevent leakage of personal information of a user.

According to an aspect of the present invention, an information processing system has a first information processing apparatus and a second information processing apparatus, in which the first information processing apparatus includes means for storing setting information arbitrarily set by a user, and in which the second information processing apparatus includes means for acquiring the setting information stored in the first information processing apparatus, means for controlling display of the acquired setting information on a screen, means for, when the setting information displayed on the screen is indicated to be valid by an operation performed by the user, authenticating whether or not the user is valid, and means for, when the user has been authenticated to be valid, executing a processing operated by the user.

According to an aspect of the present invention, in an information processing system having a first information processing apparatus and a second information processing apparatus, setting information arbitrarily set by a user is stored in the first information processing apparatus, and in the second information processing apparatus, the setting information stored in the first information processing apparatus is acquired, display of the acquired setting information on a screen is controlled, the user is authenticated to be valid or invalid when the setting information displayed on the screen is indicated to be valid by an operation performed by the user, and a processing is executed when the user has been authenticated to be valid.

According to an aspect of the present invention, an information processing apparatus (information processing method or a program) includes acquiring means (step) acquiring setting information arbitrarily set by a user which is stored in another apparatus, display controlling means (step) controlling display of the acquired setting information on a screen, authenticating means (step) authenticating whether or not the user is valid when the setting information displayed on the screen is indicated to be valid by an operation performed by the user, and processing means (step) executing predetermined processing operated by the user when the user has been authenticated to be valid.

The acquiring means is allowed to acquire the setting information from the other apparatus when the information processing apparatus has been authenticated to be valid with respect to the other apparatus by mutual authentication performed between the information processing apparatus and the other apparatus.

When the setting information displayed on the screen is indicated to be valid by an operation performed by the user, first receiving means can be set which receives input of first biometric information by the user. The acquiring means is allowed to acquire second biometric information of the user which has been stored in the other apparatus. The authenticating means is allowed to authenticate whether or not the user is valid on the basis of the received first biometric information and the acquired second biometric information.

When the setting information displayed on the screen is indicated to be valid by an operation performed by the user, second receiving means can be set which receives input of personal identification number by the user. The authenticating means is allowed to authenticate whether or not the user is valid on the basis of a result of verification of the personal identification number.

According to an aspect of the present invention, setting information arbitrarily set by a user which is stored in another apparatus is acquired, display of the acquired setting information on a screen is controlled, the user is authenticated to be valid or invalid when the setting information displayed on the screen is indicated to be valid by an operation performed by the user, and predetermined processing is executed when the user has been authenticated to be valid.

Thus, according to an aspect of the present invention, leakage of personal information of a user can be prevented.

DESCRIPTION OF THE PREFERRED EMBODIMENTS

Figure 1:
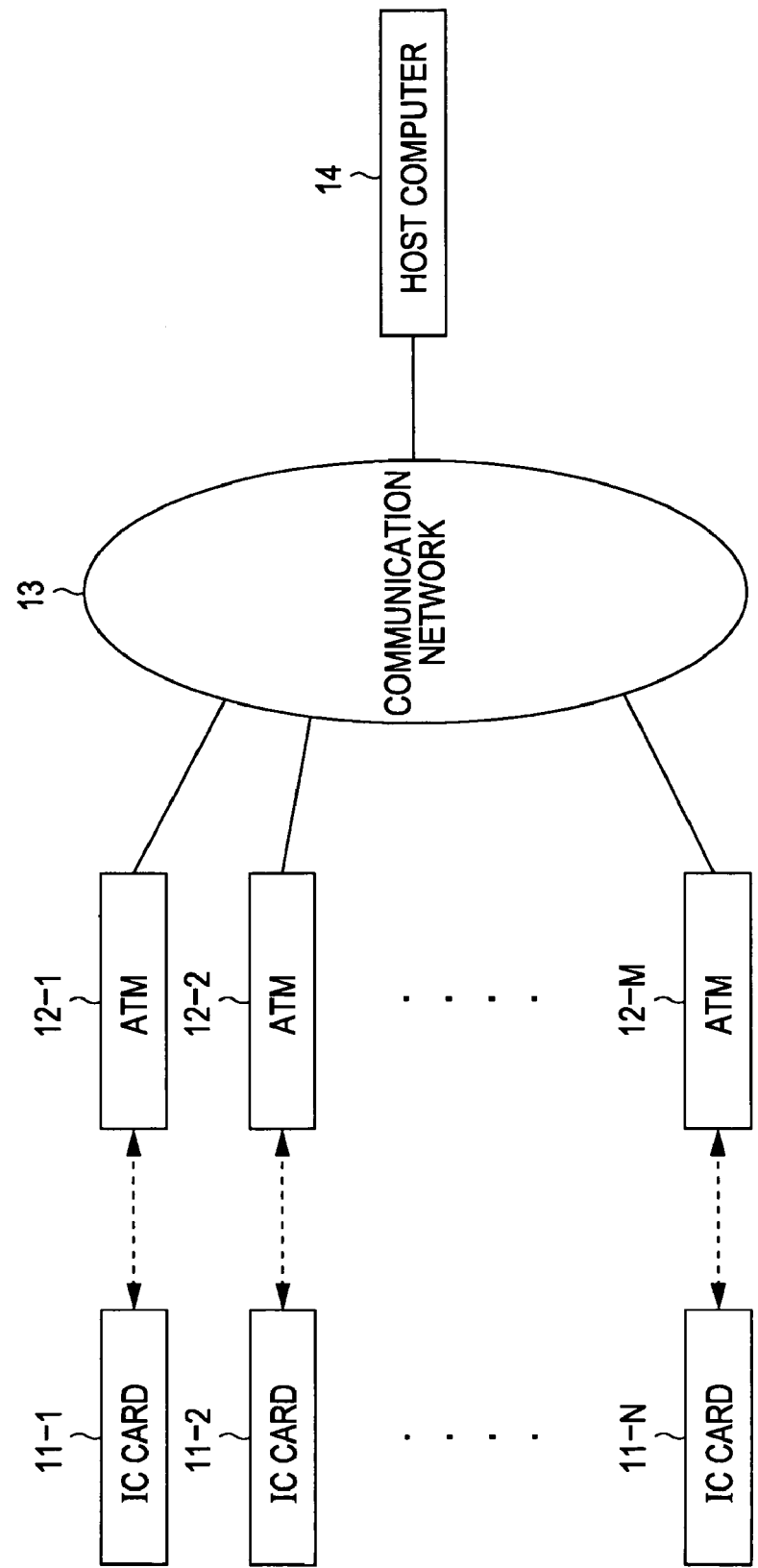
FIG. 1 is a block diagram illustrating a configuration of an ATM system according to an embodiment of the present invention.

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

In an information processing system according to an embodiment of the present invention (for example, an ATM system in FIG. 1), a first information processing apparatus (for example, an IC card 11 in FIG. 1) has a storage means (for example, a storage 34 in FIG. 2) for storing setting information arbitrarily set by a user (for example, user setting information), and a second information processing apparatus (for example, an ATM 12 in FIG. 1) has acquiring means (for example, a reader/writer 51 in FIG. 3) for acquiring the setting information stored in the first information processing apparatus, display controlling means (for example, a display control unit 54 in FIG. 3) for controlling display of the acquired setting information on a screen (for example, a screen of a display unit 55 in FIG. 3), authenticating means (for example, an authentication processing unit 58 in FIG. 3) for, the setting information displayed on the screen is indicated to be valid by an operation performed by the user, authenticating whether or not the user is valid, and processing means (for example, a controller 52 in FIG. 3) for, when the user has been authenticated to be valid, executing predetermined processing operated by the user.

According to an embodiment of the present invention, an information processing apparatus (for example, the ATM 12 in FIG. 1) has acquiring means (for example, the reader/writer 51 in FIG. 3) for acquiring setting information arbitrarily set by a user (for example, user setting information) which is stored in another apparatus (for example, the IC card 11 in FIG. 1), display controlling means (for example, the display control unit 54 in FIG. 3) for controlling display of the acquired setting information on a screen (for example, the screen of the display unit 55 in FIG. 3), authenticating means (for example, the authentication processing unit 58 in FIG. 3) for, the setting information displayed on the screen is indicated to be valid by an operation performed by the user, authenticating whether or not the user is valid, and processing means (for example, the controller 52 in FIG. 3) for, when the user has been authenticated to be valid, executing predetermined processing operated by the user.

The acquiring means can acquire the setting information from the other apparatus when the acquiring means and the other apparatus are authenticated to be valid with respect to each other by mutual authentication.

In the information processing apparatus, when it is indicated by an operation performed by the user that the setting information displayed on the screen is valid, first receiving means (for example, a biometric information input unit 57 in FIG. 3) can be set which receives input of first biometric information by the user. In addition, the acquiring means can acquire second biometric information which has been stored in the other apparatus. The authenticating means can authenticate whether or not the user is valid on the basis of the received first biometric information and the acquired second biometric information.

In the information processing apparatus, when the setting information displayed on the screen is indicated to be valid by an operation performed by the user, second receiving means (for example, an operation input unit 56 in FIG. 3) can be set which receives input of a PIN by the user. In addition, the authenticating means authenticates whether or not the user is valid on the basis of a verification result of the received PIN.

Figure 7:
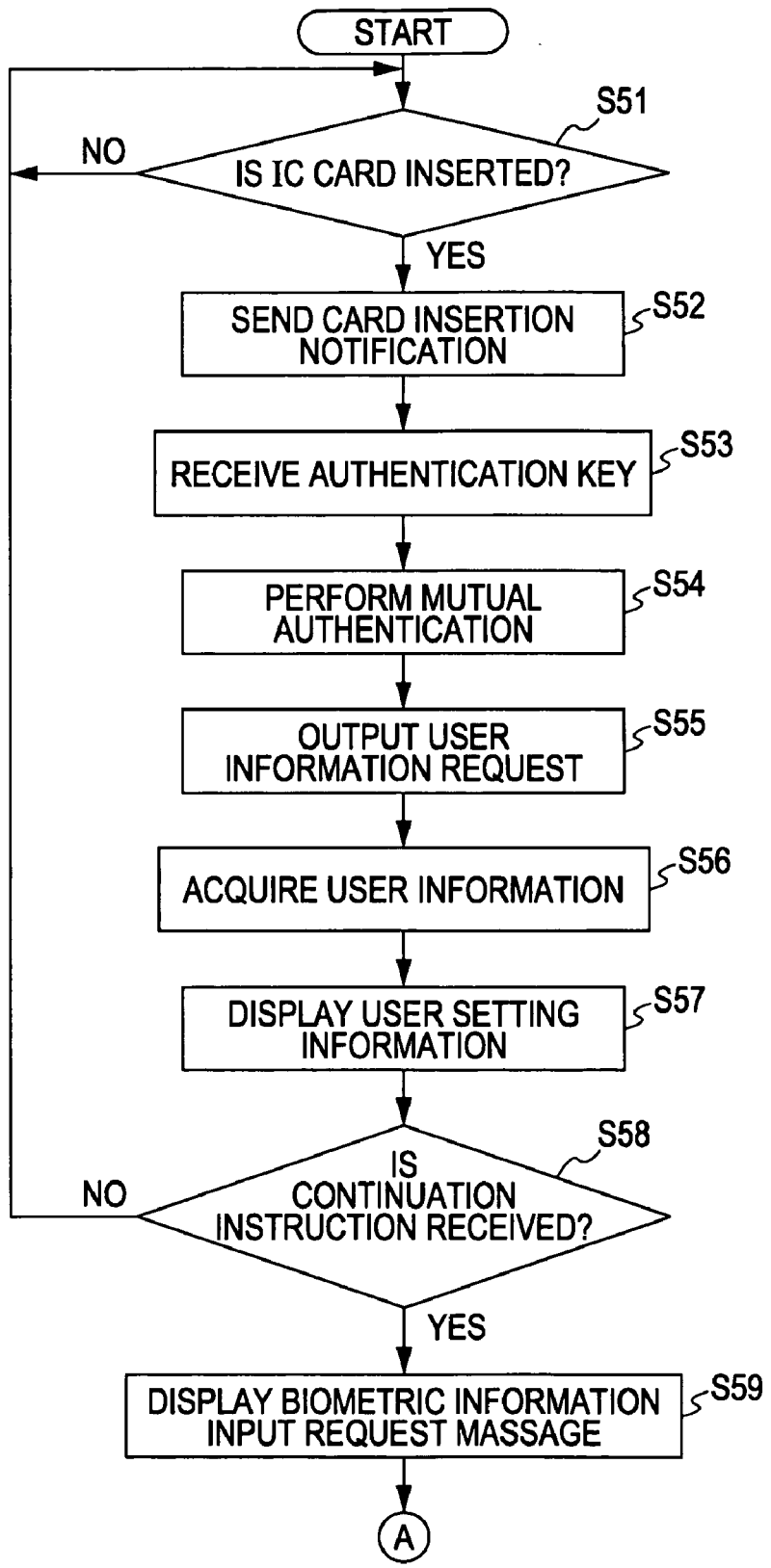
FIG. 7 is a flowchart illustrating user authentication processing performed in an ATM.
Figure 8:
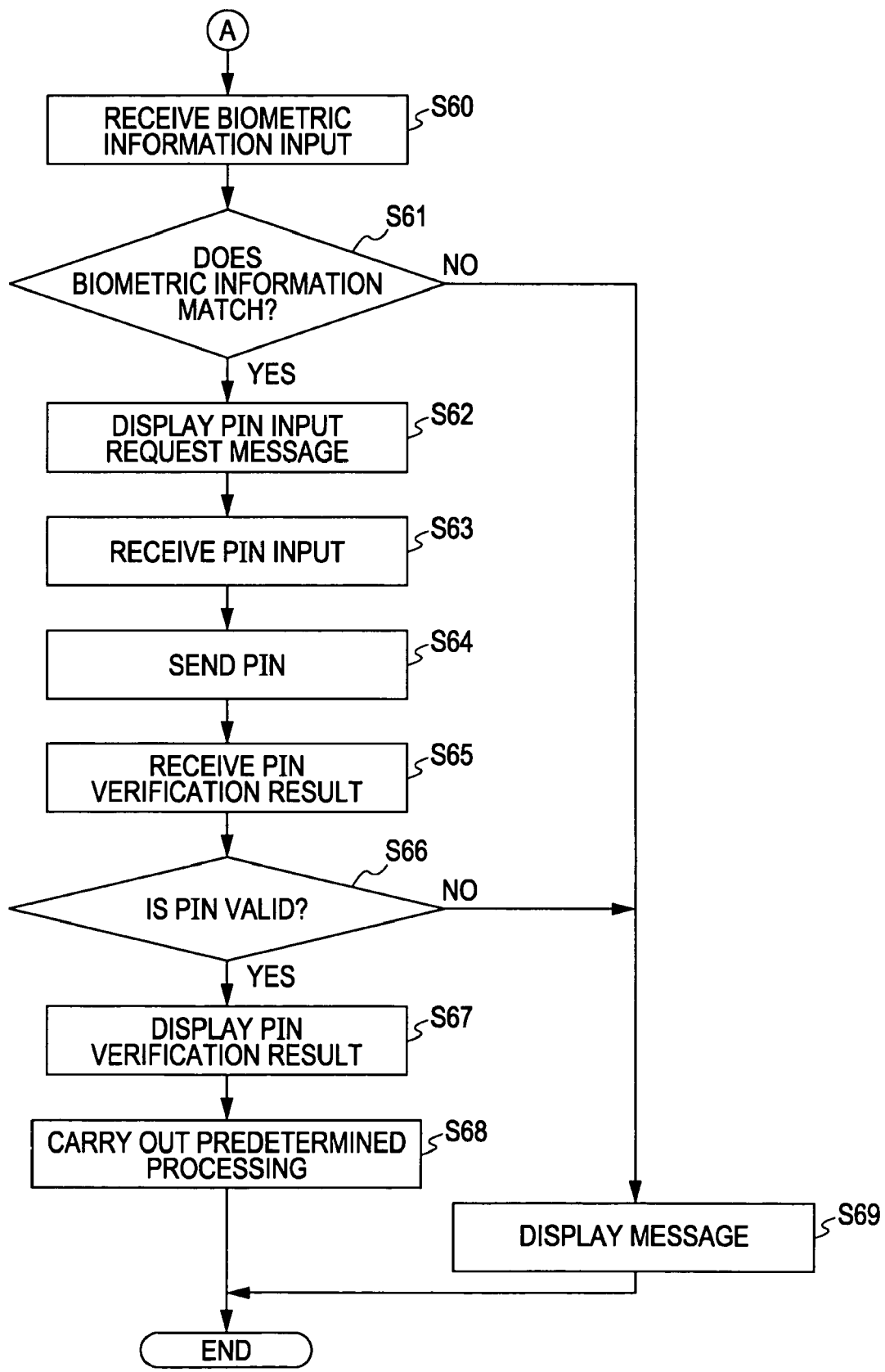
FIG. 8 is a flowchart illustrating user authentication processing performed in an ATM.

According to an embodiment of the present invention, an information processing method or a program includes a step of acquiring setting information arbitrarily set by a user which is stored in another apparatus (for example, processing of STEP S56 in FIG. 7), a step of controlling display of the acquired setting information on a screen (for example, processing of STEP S57 in FIG. 7), a step of, when the setting information displayed on the screen is indicated to be valid by an operation performed by the user, authenticating whether of not the user is valid (for example, processing of STEP S61 in FIG. 8 or processing of STEP S66 in FIG. 8), and a step of, when the user has been authenticated to be valid, executing predetermined processing operated by the user (for example, processing of STEP S68 in FIG. 8).

Figure 3:
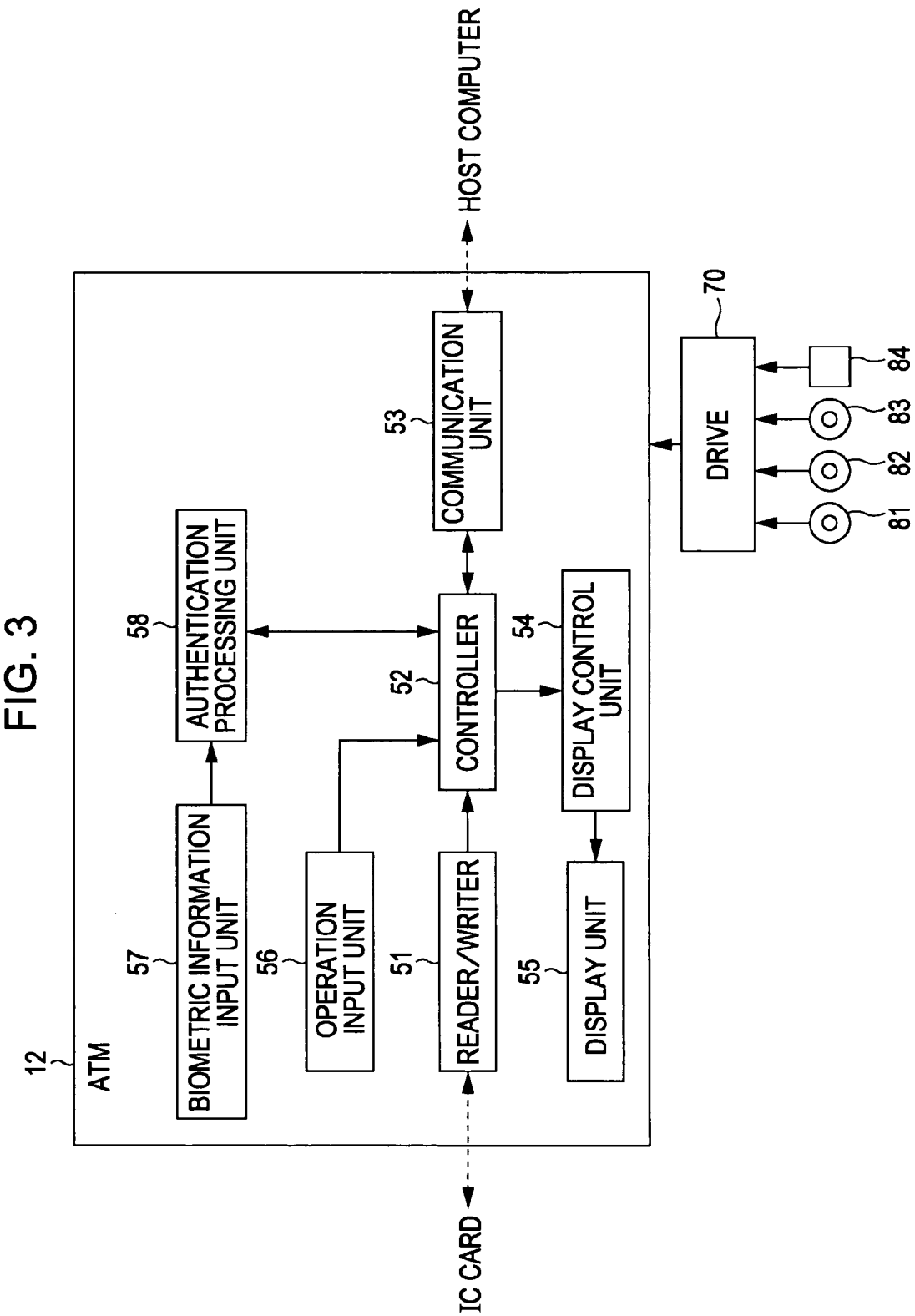
FIG. 3 is a block diagram illustrating a configuration of an ATM according to an embodiment.

A program according to an embodiment of the present invention can be recorded on a recording medium (for example, a magnetic disk 81 in FIG. 3).

In the following, the preferred embodiments of the present invention will be described with reference to the accompanying drawings.

Referring to FIG. 1, a block diagram is shown which illustrates a configuration of the ATM system 1 according to an embodiment of the present invention. The ATM system 1 is an example of an information processing system according to an embodiment of the present invention. In this ATM system 1, each of an ATM 12-1 to an ATM 12-M and a host computer 14 is connected to a communication network 13. Each of the ATM 12-1 to ATM 12-M is inserted with any of an IC card 11-1 to an IC card 11-N.

Each of the IC cards 11-1 to 11-N is a contact IC card which contacts to a contact terminal of a dedicated reader/writer contained in the ATM 12, so as to receive supply of electric power from the reader/writer and also to write and read data to and from the reader/writer. Each of the IC cards 11-1 to 11-N is an example of information processing apparatus according to an embodiment of the present invention.

The IC card 11-1 is inserted into any predetermined insertion portion (not shown) provided on each of the ATMs 12-1 to 12-M by a user operation. For example, when a user inserts the IC card 11-1 into the predetermined insertion portion provided on the ATM 12-1, the IC card 11-1 performs predetermined processing, such as authentication processing and reading/writing of data, in response to a request (command) received from the ATM 12-1.

Likewise, the IC card 11-2 is inserted into a predetermined insertion portion (not shown) provided on each of the ATMs 12-1 to 12-M. For example, when a user inserts the IC card 11-2 into the predetermined insertion portion on the ATM 12-2, the IC card 11-2 performs predetermined processing such as authentication processing in response to a request (command) received from the ATM 12-2.

In addition, similarly, each of the IC cards 11-3 to 11-N is inserted into a predetermined insertion portion (not shown) provided on each of the ATMs 12-1 to 12-M. For example, when a user inserts any of the IC cards 11-3 to 11-N into the predetermined insertion portion on each of the ATMs 12-3 to 12-M, each of the IC cards 11-3 to 11-N performs predetermined processing such as authentication processing in response to a request (command) received from any of the ATMs 12-3 to 12-M.

Each of the ATMs 12-1 to 12-M is an automatic teller machine (ATM) which is installed in, for example, a banking facility or a convenience store and executes predetermined processing, such as authentication, deposit, withdrawal, transfer, or balance inquiry, in accordance with a user operation. Each of the ATMs 12-1 to 12-M is an example of information processing apparatus according to an embodiment of the present invention.

Any of the IC cards 11-1 to 11-N is inserted into the predetermined insertion portion of ATM 12-1 by a user operation. For example, when a user inserts the IC card 11-1 into the predetermined insertion portion of the ATM 12-1, the ATM 12-1 performs predetermined processing to and from the IC card 11-1, such as authentication and data reading/writing.

Likewise, any of the IC cards 11-1 to 11-N is inserted into the predetermined insertion portion of ATM 12-2 by a user operation. For example, when a user inserts the IC card 11-2 into the predetermined insertion portion of the ATM 12-2, the ATM 12-2 performs predetermined processing such as authentication to and from the IC card 11-2.

In addition, similarly, any of the IC cards 11-1 to 11-N is inserted into any of the predetermined insertion portions of the individual ATMs 12-3 to 12-M by a user operation. For example, when a user inserts any of the IC cards 11-3 to 11-N into any of the predetermined insertion portions of the individual ATMs 12-3 to 12-M, each of the ATMs 12-3 to 12-M performs predetermined processing such as authentication to and from any of the inserted IC cards 11-3 to 11-N.

Each of the ATMs 12-1 to 12-M sends to the host computer 14 via the communication network 13 a predetermined request such as an authentication request, a withdrawal request, a deposit request, or a transfer request, in accordance with a user operation. Each of the ATMs 12-1 to 12-M receives from the host computer 14 via the communication network 13 a processing result corresponding to the predetermined request such as the authentication request.

The communication network 13 includes, for example, a dedicated line, and permits mutual communication between the ATMs 12-1 to 12-M and the host computer 14.

The host computer 14 is a device such as a general purpose large scaled computer (i.e., a main frame) or a dedicated server which performs centralized management of information (data) sent from each of the ATMs 12-1 to 12-M. In accordance with a predetermined request such as an authentication request sent from any of the ATMs 12-1 to 12-M through the communication network 13, the host computer 14 performs predetermined processing such as authentication processing. Moreover, the host computer 14 sends a processing result obtained from the predetermined processing such as authentication processing to any of the ATMs 12-1 to 12-M.

In the following description, when it is not necessary to discriminate the individual IC cards 11-1 to 11-N, the IC cards 11-1 to 11-N are simply referred to as the IC card 11. In addition, when it is not necessary to discriminate the individual ATMs 12-1 to 12-M, the ATMs 12-1 to 12-M are simply referred to as the ATM 12.

In the example of the ATM system 1 shown in FIG. 1, one host computer 14 is provided. However, a plurality of devices such as general purpose computers and dedicated serves can be provided on a function by function basis.

Figure 2:
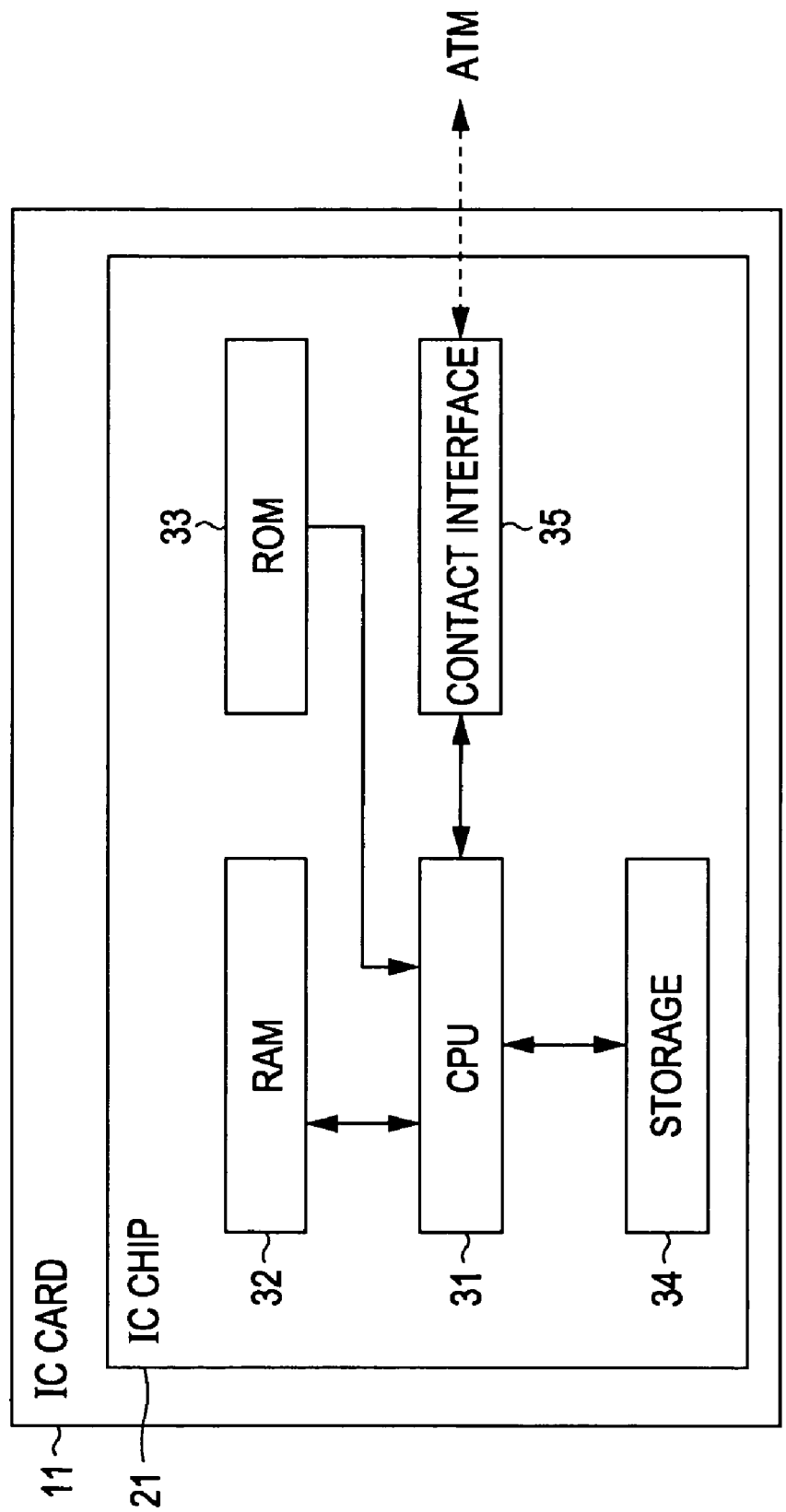
FIG. 2 is a block diagram illustrating a configuration of an IC card according to an embodiment.

FIG. 2 is a block diagram illustrating a configuration of the IC card 11.

The IC card 11 is made out of a material such as vinyl chloride or plastic, and an IC chip 21 is provided at a predetermined position on the surface of the IC card 11 (for example, at a position on the upper left of the card surface). That is, the IC card 11 can be a housing of the IC chip.

The IC chip 21 contacts to a contact terminal of the reader/writer 51 of the ATM 12, which will be described below, so as to be supplied with electric power from the contact terminal. The IC chip 21 is driven by the supplied electric power for carrying out predetermined processing such as authentication and reading/writing of data.

The IC chip 21 is configured to have a CPU (Central Processing Unit) 31, a RAM (Random Access Memory) 32, and a ROM (Read Only Memory) 33, the storage 34, and a contact interface 35.

The CPU 31 controls each component of the IC chip 21 and executes various processing in accordance with a program stored in the ROM 33. In the RAM 32, a program or data executed by the CPU 31 is stored according to need.

The storage 34 includes a non-volatile memory such as an EEPROM (Electrically Erasable Programmable Read Only Memory), a flash memory, an MRAM (Magneto-resistive Random Access Memory) or an FeRAM (Ferroelectric Random Access Memory). The CPU 31 causes the storage 34 to store various data transmitted from the contact interface 35 and reads the various data stored in the storage 34 to provide the read data to the contact interface 35.

The contact interface 35 serves to contact to a contact terminal of the reader/writer 51 of the ATM 12 which will be described below. The surface of the contact interface 35 is gold plated, for example. The contact interface 35 contacts to the contact terminal of the reader/writer 51 of the ATM 12, thus supplying electric power from the contact terminal of the reader/writer 51 to the components of the IC chip 21, transmitting various data input from the contact terminal of the reader/writer 51 to the CPU 31, and outputting various data transmitted from the CPU 31 to the contact terminal of the reader/writer 51.

FIG. 3 is a block diagram illustrating a configuration of features of the ATM 12.

When the IC card 11 is inserted into a predetermined insertion portion (not shown) provided on the ATM 12, the ATM 12 performs predetermined processing, such as authentication processing and reading/writing of data, to and from the inserted IC card 11. In addition, in response to a user operation, the ATM 12 transmits a predetermined request (for example, an authentication request, a deposit request, a withdrawal request, or a transfer request) to the host computer 14 via the communication network 13. The ATM 12 receives from the host computer 14 via the communication network 13 a processing result corresponding to the predetermined request such as the authentication request.

The ATM 12 is configured to have the reader/writer 51, the controller 52, the communication unit 53, the display control unit 54, the display unit 55, the operation input unit 56, the biometric information input unit 57, and the authentication processing unit 58.

The reader/write 51 acquires predetermined data (command) transmitted from the IC card 11 and also outputs predetermined data (command) to the IC card 11. The reader/writer 51 has, for example, a contact terminal (not shown) for reading data from the IC card. When the contact terminal of the reader/writer 51 and the contact interface of the IC card 11 shown in FIG. 2 are contacted, the reader/writer 51 send the controller 52 a signal indicating that the IC card 11 has been inserted.

The controller 52 controls each component of the ATM 12. When the signal indicative of the insertion of the IC card 11 is provided from the reader/writer 51, the controller 52 generates a notification indicative of the insertion of the IC card 11 (hereinafter referred to as a card insertion notification), and transmits the generated card insertion notification to the communication unit 53.

The communication unit 53 transmits the card insertion notification provided by the controller 52 to the host computer 14 via the communication network 13. The communication unit 53 also receives a key transmitted from the host computer 14 via the communication network 13 in response to the card insertion notification, which is set in advance for performing authentication (mutual authentication) between the IC card 11 and the ATM 12 (hereinafter referred to as an authentication key), and provides the received authentication key t the controller 52.

On the basis of the authentication key provided from the communication unit 53, the controller 52 performs mutual authentication with the IC card 11 using the reader/writer 51. This mutual authentication is processing for allowing the IC card 11 and the ATM 12 to verify the validity of each other, which will be described in more detail below.

When the IC card 11 and the ATM 12 are authenticated to be valid as a result of the mutual authentication, the controller 52 generates a request for reading information concerning a user who possesses the IC card 11 (hereinafter referred to as user information), which is stored in the IC card 11. Hereinafter, such a request is referred to as a user information request. The controller 52 outputs the generated user information request to the IC card 11 via the reader/writer 51. Through the reader/writer 51, the controller 52 acquires user information provided by the IC card 11 in response to the user information request and transmits the acquired user information to the display control unit 54 and the authentication processing unit 58.

The display control unit 54 controls display of predetermined information which is contained in the user information provided from the controller 52 on a screen of the display unit 55. The display unit 55 includes, for example, an LCD (Liquid Crystal Display), an organic EL (Electro Luminescence) display, or an LED (Light Emitting Diode) display, and displays information associated with a user operation on the screen thereof on the basis of control performed by the display control unit 54.

The biometric information input unit 57 is configured as, for example, a vein sensor, a fingerprint sensor, or an iris recognition device, and receives input of biometric information of a user (for example, dorsal hand vein, fingerprint, or iris). The biometric information input unit 57 then transmits the received biometric information to the controller 52.

The authentication processing unit 58 executes biometric information verification processing on the basis of user information provided from the controller 52 (for example, biometric information stored in the IC card 11 of FIG. 2) and biometric information provided from the biometric information input unit 57. The authentication processing unit 58 then provides the result of the biometric information verification processing to the controller 52.

Note that the biometric information verification processing is so-called biometric authentication in which user verification is performed using information unique to an individual user such as a physical feature or a physical characteristic. A scheme employed for such biometric authentication is not limited to those mentioned above. For example, the voice of a user can be used as a physical characteristic.

The controller 52 generates message corresponding to the authentication result performed by the authentication processing unit 58 and provides the generated message to the display control unit 54. The display control unit 54 displays the message corresponding to the authentication result provided from the controller 52 on the screen of the display unit 55.

The operation input unit 56 is configured as an interface, such as ten keys or a touch panel (for example, the screen of the display unit 55) which allows a user to operate the ATM 12. The operation input unit 56 provides the controller 52 a signal corresponding to a user operation such as input of a PIN (Personal Identification Number).

The controller 52 provides the communication unit 53 the PIN received from the operation input unit 56 to send the PIN to the host computer 14 via the communication network 13. The controller 52 receives the result of the PIN verification sent from the host computer 14 via the communication unit 53 and provides the received PIN verification result to the authentication processing unit 58.

On the basis of the PIN verification result provided by the communication unit 53 via the controller 52, the authentication processing unit 58 authenticates whether or not the PIN is valid and sends the result of the authentication to the controller 52. The controller 52 then, similarly to the above, generates a message corresponding to the authentication result and sends the generated message to the display control unit 54 to display the message on the screen of the display unit 55.

A drive 70 is connected to the ATM 12 as necessary. The drive 70 is mounted with a recording medium such as the magnetic disk 81, an optical disk 82, a magneto-optical disk 83, or a semiconductor memory 84, according to need. The drive 70 reads a program stored in the recording medium such as the magnetic disk 81, the optical disk 82, the magneto-optical disk 83, or the semiconductor memory 84 and sends the read program to either the controller 52 or the display control unit 54.

Thus, each of the controller 52 and the display control unit 54 can execute the program read from the magnetic disk 81, the optical disk 82, the magneto-optical disk 83, or the semiconductor memory 84.

Figure 4:
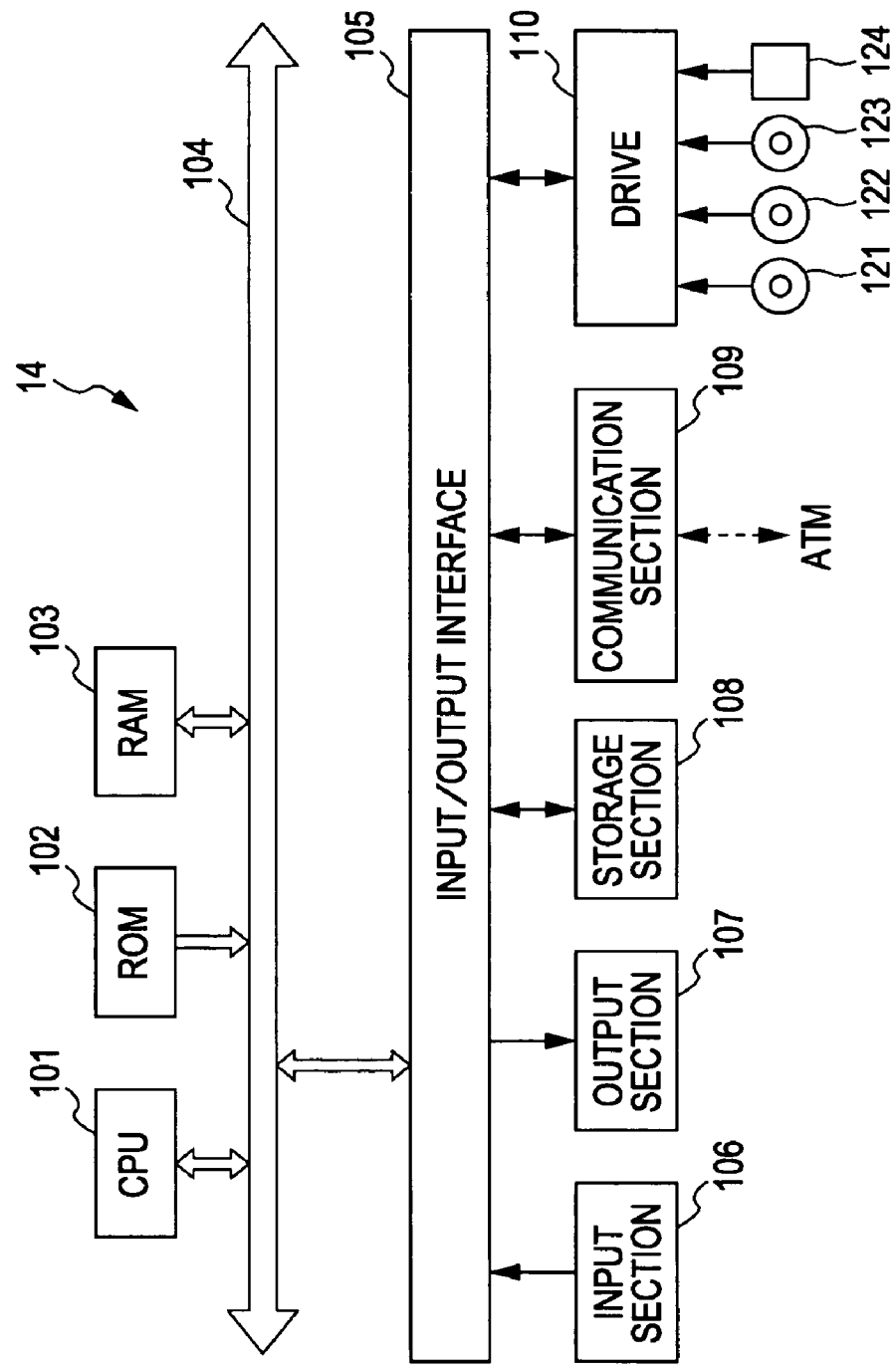
FIG. 4 is a block diagram illustrating a host computer according to an embodiment.

FIG. 4 is a block diagram illustrating a configuration of the host computer 14.

A CPU 101 executes various processing in accordance with a program stored in a ROM 102 or a program stored in a storage section 108. In a RAM 103, a program or data to be executed by the CPU 101 are stored according to need. The CPU 101, the ROM 102, and the RAM 103 are interconnected via a bus 104.

The CPU 101 is also connected to an input/output interface 105 via the bus 104. The input/output interface 105 is also connected to an input section 106 including a keyboard and a mouse, and an output section 107 including a display. The CPU 101 executes various processing corresponding to a command input from the input section 106 and outputs data obtained as the result of the execution of the processing to the output section 107.

The storage section 108 is connected to the input/output interface 105 is composed of hardware, for example, and stores various data and programs to be executed by the CPU 101.

A communication section 109 communicates with an external apparatus (for example, the ATM 12) via the communication network 13, for example. Through this communication section 109, a program can be acquired and stored in the storage section 108.

A drive 110 is connected to the input/output interface 105. The drive 110 drives a recording medium such as a magnetic disk 121, an optical disk 122, a magneto-optical disk 123, or a semiconductor memory 124, when mounted with the recording medium, and acquires a program, data, etc. stored in the recording medium. The acquired program or data is transferred to the storage section 108 so as to be stored.

Figure 5:
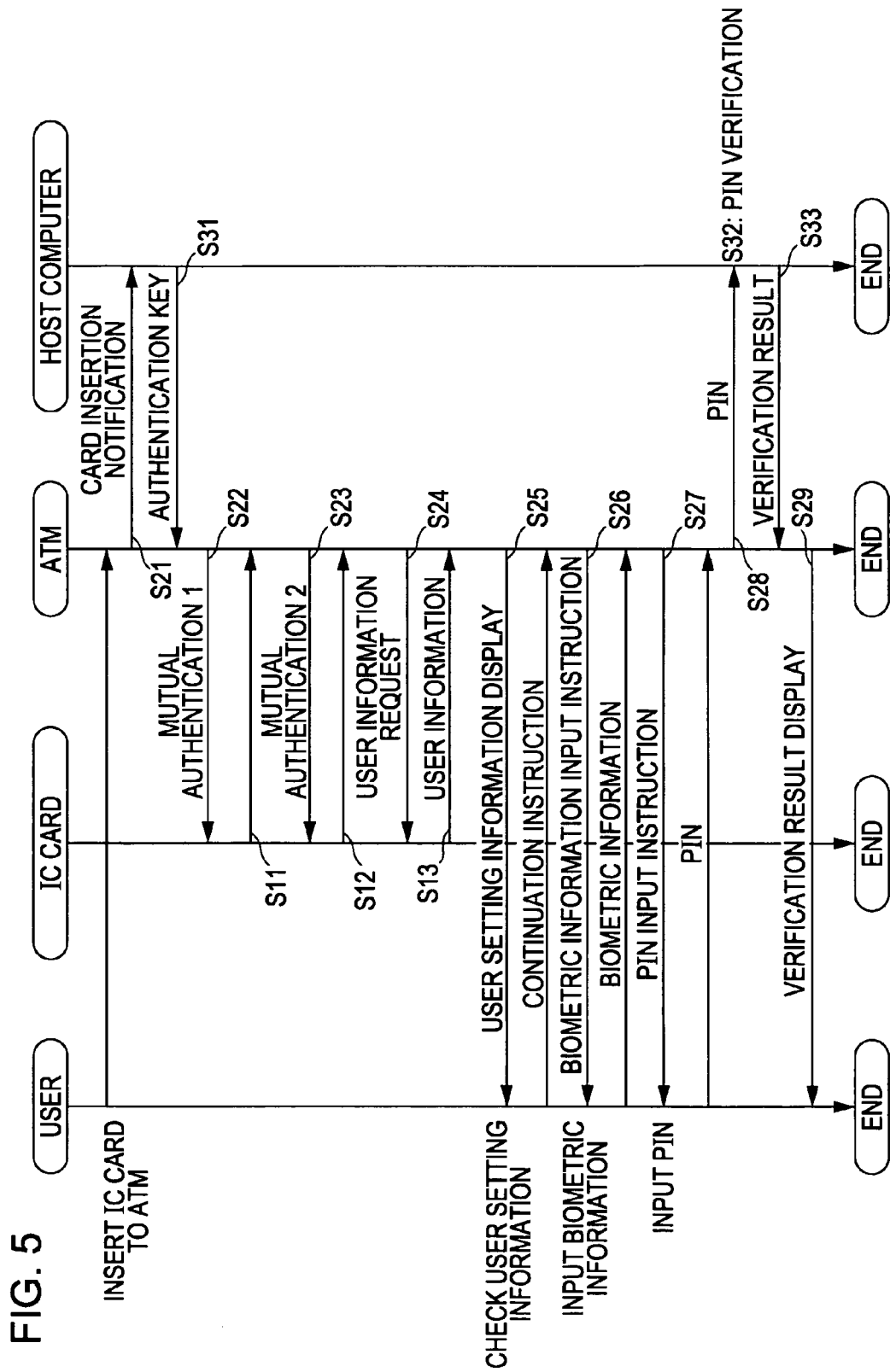
FIG. 5 is a sequence diagram illustrating an outline of processing procedure in the ATM system of FIG. 1 in its entirety.

Referring now to FIG. 5, a sequence diagram is shown which illustrates an outline of processing procedure performed in the ATM system 1 shown in FIG. 1 as its entirety. Using this sequence diagram, processing procedure performed when a user withdraws money from the ATM 12 using the IC card 11 will be described as an example of processing procedure performed in the ATM system 1 according to an embodiment of the present invention.

The outline of processing performed in the ATM system 1 in its entirety will first be described with reference to the sequence diagram of FIG. 5. Then, a processing procedure performed by the individual apparatuses will be described with reference to FIGS. 7 to 11. To facilitate understanding of the description, the sequence diagram of FIG. 5 also shows an operation performed by a user. Specifically, in FIG. 5, each of a user operation, processing performed by the IC card 11, processing performed by the ATM 12, and the processing performed by the host computer 14 is shown in that order from the left side of the figure.

When the user inserts the IC card 11 that he or she possesses into the ATM 12 to withdraw money, the ATM 12 sends a card insertion notification, which is a notification indicating that it is inserted with the IC card 11, to the host computer 14 via the communication network 13, at STEP S21.

At STEP S31, in response to the card insertion notification sent from the ATM 12, the host computer 14 sends an authentication key, which is set in advance for mutual authentication between the IC card 11 and the ATM 12, to the ATM 12 via the communication network 13.

At STEP S11, STEP S12, STEP S22, and STEP S23, each of the IC card 11 and the ATM 12 performs mutual authentication processing.

It is herein noted that the mutual authenticating processing refers to processing which allows the IC card 11 and the ATM 12 to verify the validity of each other. For example, the ATM 12 can read data from the IC card 11, only when mutual authentication with the IC card 11 is performed and the IC card 11 and the ATM 12 are determined to be valid with respect to each other as the result of the mutual authentication.

Figure 6:
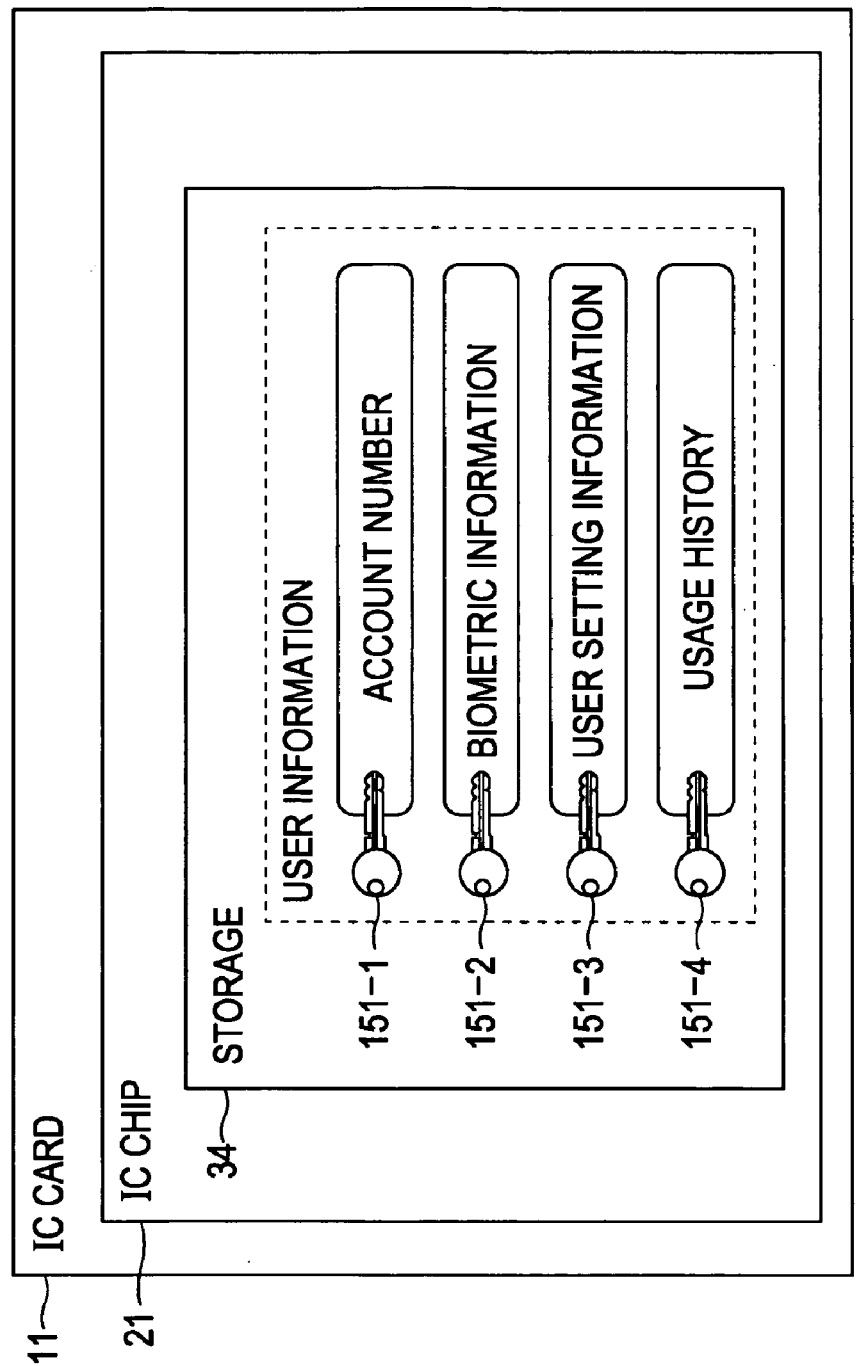
FIG. 6 illustrates data stored in an IC card in detail.

A detailed description of the mutual authentication will be provided with reference to FIG. 6. In the figure, data stored in the IC card 11 is illustrated in detail.

The same reference numerals as in FIG. 2 denote the same items in FIG. 6, and therefore a description of those items will be omitted as necessary. For the IC card 11 shown in FIG. 6, only the IC chip 21 and the storage 34 are shown for facilitation of the illustration. However, the IC card 11 of FIG. 6 has the same configuration of the IC card 11 described with reference to FIG. 2.

In the storage 34 of the IC cards, information concerning the holder of the IC card 11 (user information) is stored in advance. For example, the user information includes information on an account number of the user, information used for biometric authentication, user setting information which is arbitrary information set in advance by the user, and information on a usage history which is historical information concerning the use of the IC card 11 by the user. These pieces of user information can be store in the IC card 11.

In addition, the individual pieces of user information are protected by different keys. Thus, corresponding keys are necessary to access these pieces of user information. Specifically, in order for the ATM 12 to read one of these pieces of user information stored in the IC card 11, it is necessary to perform mutual authentication with the IC card 11 at first. Then, only when the validity of the ATM 12 and IC card 11 with respect to each other is authenticated as the result of the mutual authentication, the ATM 12 can read the piece of user information.

More specifically, in the example of the user information shown in FIG. 6, the account number is protected by a key 151-1, the biometric information is protected by a key 151-2, the user setting information is protected by a key 151-3, and the usage history is protected by a key 151-4. The ATM 12 stores authentication keys corresponding to the keys 151-1 to 151-4 stored in the IC card 11 (i.e., authentication keys 151-1 to 151-4) which are received from the host computer 14. When the ATM 12 attempts to read the user setting information from the IC card 11, the ATM 12 reads the authentication key 151-3 corresponding to the user setting information and performs mutual authentication processing using the read authentication key.

Referring back to the sequence diagram in FIG. 5, at STEP S22, the ATM 12 performs mutual authentication with the IC card 11 for accessing the user setting information stored in the IC card 11 (mutual authentication 1). At STEP S11, the IC card 11 performs the mutual authentication 1 with the ATM 12. Thus, the processing of STEP S22 and STEP S11 (mutual authentication 1) is mutual authentication performed between the ATM 1 and the IC card 11, which allows the ATM 12 to access the user setting information stored in the IC card 11.

For example, in the processing of mutual authentication 1, the ATM 12 generates a predetermined random number, such as a binomial random number, a Poisson random number, or a normal random number, and then notifies to the IC card 11 the generated random number and information indicative of the user setting information intended to read. Then, the IC card 11 reads the key 151-3 corresponding to the user setting information notified from the ATM 12, encrypts the notified random number using the key 151-3, and then outputs the encrypted random number to the ATM 12. The ATM 12 decrypts the encrypted random number using the authentication key. The ATM 12 authenticates the validity of the IC card 11 when the random number notified by the card 11 and the decrypted random number match.

Similarly, the IC card 11 generates a predetermined random number and notifies the generated random number to the ATM 12. The ATM 12 encrypts the notified random number using the authentication key 151-3 and notifies the encrypted random number to the IC card 11. Then, the IC card 11 decrypts the encrypted random number using the key 151-3 and authenticates the validity of the ATM 12 when the decrypted random number and the random number notified to the ATM 12 match.

At STEP S23, the ATM 12 performs mutual authentication with the IC card 11 for accessing the biometric information stored in the IC card 11 (mutual authentication 2). At STEP S12, the IC card 11 performs the mutual authentication 2 with the ATM 12. Thus, the processing of STEP S23 and STEP S12 is mutual authentication performed between the ATM 1 and the IC card 11, which allows the ATM 12 to access the biometric information stored in the IC card 11 (mutual authentication 2).

For example, in the processing of mutual authentication 2, similarly to the processing of the mutual authentication 1, each of the IC card 11 and the ATM 12 generates encrypted data to be verified by each other and mutually checks the encrypted data, so as to authenticate the validity of each other.

When the validity of the ATM 12 and the IC card 11 is verified as the result of the mutual authentication, the ATM 12 is permitted to access the IC card 11. Thus, the ATM 12 sends a user information request to the IC card 11 so as to acquire the user information stored in the IC card 11, at STEP S24.

In response to the user information request sent by the ATM 12, the IC card 11 sends the user information stored therein to the ATM 12, at STEP S13. In this case, since the IC card 11 and the ATM 12 have performed the mutual authentication 1 and the mutual authentication 2 with respect to the user setting information and the biometric information, respectively, as described above, the IC card 11 sends the user setting information and the biometric information to the ATM 12.

At STEP S25, the ATM 12 acquires the user information sent from the IC card 11 (i.e., the user setting information and the biometric information) and displays the acquired user information on, for example, an LCD (the screen of the display unit 55).

At this time, the user checks the user setting information displayed on the screen of the ATM 12. When the displayed user setting information is valid, the user touches a button (contacts to an area of a touch panel) which causes the ATM 12 to proceeds to the processing indicated on the screen such as money withdrawal. Thus, the ATM 12 is input with an instruction for continuing the processing of money withdrawal (hereinafter referred to as a continuation instruction).

On the basis of the continuation instruction input by the user for continuing the processing of money withdrawal, the ATM 12 displays a massage on the screen which prompts the user to input the biometric information (for example, vein information), at STEP S26.

Then, the user inputs his or her vein information (biometric information) to the ATM 12 by placing his or her hand on a vein sensor installed in the ATM 12.

The ATM 12 compares the vein information (biometric information) read from the hand of the user and the biometric information acquired from the IC card 11. When these two pieces of biometric information are determined to match, the ATM 12 displays a message on the screen which prompts the user to input a PIN, at STEP S27.

Then, the user inputs, for example, a four-digit PIN in accordance with the massage displayed on the screen of the ATM 12 which prompts PIN input.

At STEP S28, the ATM 12 sends the four-digit PIN input by the user to the host computer 14 via the communication network 13.

At STEP 32, the host computer 14 verifies whether or not the PIN input by the user which is transmitted from the ATM 12 and a PIN recorded in advance. At STEP S33, the host computer 14 sends the result of the PIN verification (hereinafter referred to as a verification result) to the ATM 12 via the communication network 13.

At STEP S29, the ATM 12 displays on the screen the verification result sent by the host computer 14, i.e., a message indicative of whether or not the processing of money withdrawal can be continued.

At this time, the user checks the verification result displayed on the screen of the ATM 12. When the verification result indicates that the continuation of the processing of money withdrawal is possible, the user then causes the ATM 12 to proceed to processing such as processing for specifying the amount of money to be withdrawn.

Thus, user setting information set in advance by a user is displayed so as to allow the user to input the biometric information or a PIN after he or she checks the displayed user setting information. This prevents the user from inputting his or her biometric information or PIN without caution, thus preventing leakage of personal information of the user even if the ATM used by the user is a counterfeit.

In the example described above, the case is described where the mutual authentication 1 and the mutual authentication 2 are employed as a mutual authentication scheme. However, implementation of an embodiment of the present invention is not limited to the case. For example, when the ATM 12 accesses the account number or the usage history stored in the IC card 11, mutual authentication is similarly performed between the IC card 11 and the ATM 12. In addition, the manner in which mutual authentication is performed described above is described for illustrative purpose only, and any manner can be applied which allows the IC card 11 and the ATM 12 to verify the validity of each other.

Further, in the example described above, the authentication keys (for example, authentication keys 151-1 to 151-4) used for the mutual authentication between the IC card 11 and the ATM 12 are acquired from the host computer 14. However, it is also possible that the ATM 12 stores the authentication keys in advance.

In the following, each of the processing procedures performed by the IC card 11, the ATM 12, and the host computer 14 described using the sequence diagram of FIG. 5 will be described in more detail with reference to FIG. 7 to FIG. 10.

The processing procedure performed by the ATM 12 for user authentication will first be described with reference to flowcharts of FIG. 7 and FIG. 8.

At STEP S51, the controller 52 determines whether or not the IC card 11 has been inserted into the ATM 12 on the basis of a signal sent by the reader/writer 51 which is indicative of the completion of the insertion of the IC card 11.

When it is determined that the IC card 11 has not been inserted in STEP S51, the processing procedure returns to STEP S51 and the above-described processing is repeated. Specifically, the ATM 12 is in an idle state waiting for the insertion of the IC card 11.

When it is determined, in STEP S51, that the IC card 11 has been inserted, the processing procedure proceeds to the STEP S52. At STEP S52, the communication unit 53 sends a card insertion notification to the host computer 14 via the communication network 13 in accordance with control performed by the controller 52. For example, the controller 52, when provided by the reader/writer 51 with the signal indicative of the completion of the card insertion, generates the card insertion notification and provides the generated card insertion notification to the communication unit 53. Then, the communication unit 53 sends the card insertion notification provided by the controller 52 to the host computer 14 via the communication network 13.

At STEP S53, the communication network 53 receives an authentication key sent by the host computer 14 in response to the card insertion notification. The communication unit 53 provides the received authentication key to the controller 52.

AT STEP S54, the controller 52 performs mutual authentication with the IC card 11 on the basis of the authentication key provided by the communication unit 53. For example, the controller 52 performs mutual authentication (for example, the mutual authentication 1 and the mutual authentication 2 in FIG. 5) for accessing the user setting information and the biometric information stored in the IC card 11 held in contact to the contact terminal of the reader/writer 51. The detailed description of the mutual authentication performed between the ATM 12 and the IC card 11 is given above using the sequence diagram of FIG. 5 (STEPs S11, S12, S22, and S23), and a description thereof will be omitted.

At STEP S55, the reader/writer 51 outputs a user information request to the IC card 11 in accordance with control performed by the controller 52. For example, when validity of the IC card 11 and the ATM 12 is verified through the mutual authentication performed for accessing the user setting information and the biometric information, the controller 52 generates the user information request so as to read the user information (user setting information and biometric information) stored in the IC card 11. The controller 52 then provides the generated user information request to the reader/writer 51. The reader/writer 51 outputs the user information request provided by the controller 52 to the IC card 11.

At STEP S56, the reader/writer 51 acquires the user information input from the IC card 11 in response to the user information request. The reader/writer 51 then passes the acquired user information to the controller 52. For example, the reader/writer 51 acquires from the IC card 11 biometric information and user setting information as the user information in STEP S56, and transmits, through the controller 52, the user setting information to the display control unit 54 and the biometric information to the authentication processing unit 58.

At STEP S57, the display control unit 54 displays predetermined information contained in the user information transmitted by the reader/writer 51 through the controller 52 on the screen of the display unit 55. For example, the controller 52, out of the user information passed by the reader/writer 51, transmits the user setting information to the display control unit 54. The display control unit 54 displays the user setting information transmitted by the controller 52 on the screen of the display unit 55.

An example of the screen of the display unit 55 on which the user setting information is displayed will be illustrated with reference to FIG. 9.

On the screen of the display unit 55, for example, a character string "xxxxxxxxxxxxxxxxxxxxxxxxxxxxxx" is displayed as user setting information 201 set in advance by the user. In addition to the character string, a button (or a touch indication) 202 for continuing to subsequent processing and a button (or a touch indication) 203 for canceling the subsequent processing are displayed.

Specifically, for example, the user checks the user setting information 201 displayed on the screen of the display unit 55, which is indicated by "xxxxxxxxxxxxxxxxxxxxxxxxxxxxxx". Then, when the user setting information 201 is the same as that set by the user, the user touches or depresses the button 202 so as to continue to the subsequent processing such as authentication processing. When the user setting information 201 is not the same as that set by the user, the user touches or depresses the button 203 so as to cancel the subsequent processing.

The user setting information 201 is not limited to the above-mentioned character string. The user setting information 201 can be any information, such as an image or voice, which is set in advance by the user and allows the user to recognize by sight or sound that the information is the same as that set by the user. In addition, the information displayed on the screen of the display unit 55 is not limited to user setting information and can be any other user information such as usage history.

Referring back to the flowchart of FIG. 7, the controller 52 determines on the basis of a continuation instruction (operation signal) provided by the operation input unit 56 whether or not the predetermined processing specified by the user is to be performed, at STEP S58.

Figure 9:
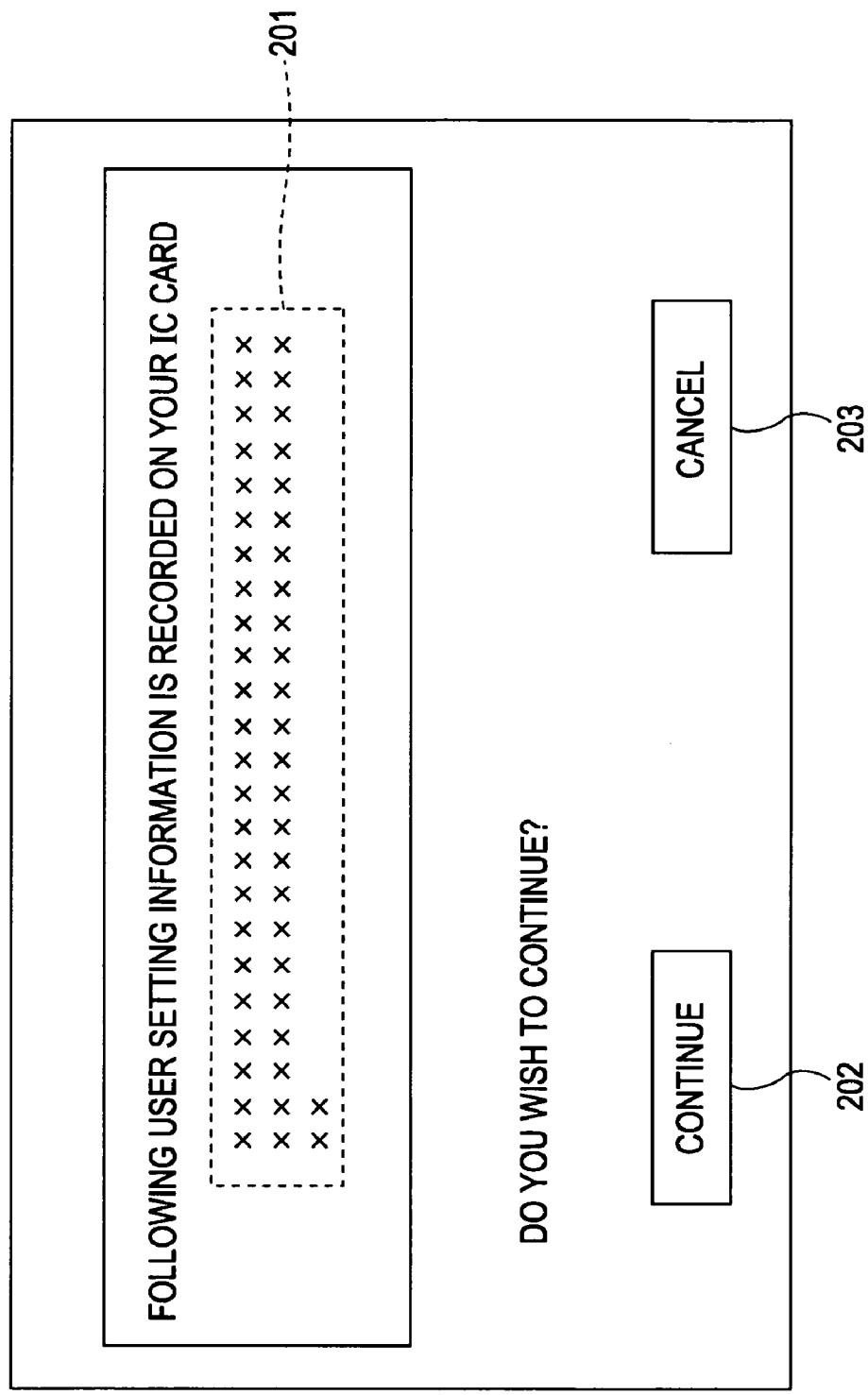
FIG. 9 shows an example of a screen of a display unit displaying user setting information.

For example, when the controller 52 determines not to continue to the predetermined processing in response to the touch or depression of the button 203 of FIG. 9 by the user in STEP S58, the subsequent processing is canceled. Thus, the processing procedure returns to STEP S51, and the processing described above is repeated.

On the other hand, for example, when the controller 52 determined to continue to the predetermined processing in response to the touch or depression of the button 202 of FIG. 9 by the user in STEP S 58, the processing procedure proceeds to STEP S59. At STEP S59, the display control unit 54 displays a predetermined message which requests input of the biometric information on the screen of the display unit 55. For example, in STEP S 59, when an operation signal sent from the operation input unit 56 is a signal indicative of continuation of the predetermined processing (continuation instruction), the controller 52 generates the predetermined message for requesting input of the biometric information and transmits the generated message to the display control unit 54. The display control unit 54 displays the predetermined message received from the controller 52 for requesting the input of the biometric information on the screen of the display unit 55.

At STEP S60, the biometric information input unit 57 receives the biometric information of the user. The biometric information input unit 57 transmits the received biometric information of the user to the authentication processing unit 58. For example, when the biometric information input unit 57 is configured as a vein sensor, in STEP S60, the biometric information input unit 57 receives information concerning the dorsal hand vein (vein pattern) of the user and transmits the received vein pattern to the authentication processing unit 58.

At STEP S61, the authentication processing unit 58 executes biometric information verification processing on the basis of the biometric information of the user which is stored in the IC card 11 and received through the reader/writer 51 and the biometric information of the user input from the biometric information input unit 57, so as to determine whether or not these pieces of biometric information match. For example, in STEP S61, the authentication processing unit 58 determines whether or not a vein pattern which is collected in advance and provided from the reader/writer 51 and a vein pattern which is acquired by the user while he or she operates the ATM 12 (during the authentication processing) and input from the biometric information input unit 57 match (i.e., vein authentication).

Note that a manner which can be employed for biometric authentication is not limited to the example described above. Any physical feature or characteristic, for example, fingerprint, iris, voice, etc., can also be used for biometric authentication.

If, in STEP S61, it is determined that the two pieces of the biometric information do not match, the processing procedure proceeds to STEP S69. At STEP S69, the display control unit 54 displays a message indicative of the mismatch of the biometric information on the screen of the display unit 55. For example, in STEP S69, when the authentication processing unit 58 determines that the two pieces of the biometric information do not match, the controller 52 generates a predetermined message indicative of the mismatch of the biometric information and sends the generated message to the display control unit 54. The display control unit 54 displays the message sent by the controller 52 which is indicative of the mismatch of the biometric information on the screen of the display unit 55.

On the other hand, if, in STEP S61, it is determined that the two pieces of the biometric information match, the processing procedure proceeds to STEP S62. At STEP S62, the display control unit 54 displays a predetermined message requesting input of a PIN on the screen of the display unit 55. For example, in STEP S62, when the authentication processing unit 58 determines that the vein pattern collected in advance and the vein pattern acquired during the authentication processing match, the controller 52 generates a predetermined message requesting input of the PIN and sends the generated message to the display control unit 54. The display control unit 54 displays the message sent by the controller 52 which request input of the PIN on the screen of the display unit 55.

At STEP S63, the operation input unit 56 receives input of the PIN by the user and sends the input PIN to the controller 52. For example, in STEP S63, the operation input unit 56 receives input of a four-digit PIN by the user and sends the input four-digit PIN to the controller 52.

At STEP S64, the communication unit 53 sends the PIN to the host computer 14 via the communication network 13 in accordance with control performed by the controller 52. For example, the controller 52, when provided with the four-digit PIN from the operation input unit 56, sends the four-digit PIN to the host computer 14 via the communication network 13.

At STEP S65, the communication unit 53 receives a PIN verification result sent from the host computer 14 in accordance with the PIN. The communication unit 53 provides the received PIN verification result to the controller 52. For example, in STEP S65, the communication unit 53 receives a PIN verification result indicative of the validity of the PIN and provides the received verification result to the authentication processing unit 58 through the controller 52.

At STEP S66, the authentication processing unit 58 determines whether or not the PIN input by the user is valid on the basis of the PIN verification result provided from the communication unit 53 through the controller 52.

If, in STEP S66, it is determined that the PIN is invalid, the processing procedure proceeds to STEP S69. At STEP S69, the display control unit 54 displays a message indicating that the PIN is invalid on the screen of the display unit 55. For example, in STEP S69, when the PIN is determined to be invalid in the authentication processing unit 58, the controller 52 generates a predetermined message indicative of the invalidity of the PIN and transmits the generated message to the display control unit 54. The display control unit 54 displays the message indicative of the invalidity of the PIN provided by the controller 52 on the screen of the display unit 55.

On the other hand, if, in STEP S66, the PIN is determined to be valid, the processing procedure proceeds to STEP S67. At STEP S67, the display control unit 54 displays the PIN verification result provided from the communication unit 53 on the screen of the display unit 55. For example, if the PIN is determined to be valid in the authentication processing unit 58 in STEP S66, the controller 52 generates a message indicative of the validity of the PIN and provides the generated message to the display control unit 54. The display control unit 54 then displays the message indicative of the validity of the PIN provided by the controller 52 on the screen of the display unit 55.

At STEP S68, the controller 52 executes predetermined processing, such as deposit, withdrawal, transfer, or balance inquiry, in accordance with a user operation, and then terminates the processing procedure.

Thus, the ATM 12 is capable of displaying user setting information, which has been set by a user and stored in the IC card 11, on the screen of the display unit 55. This enables the user to determine if the ATM 12 is a counterfeit or not, thus preventing leakage of his or her personal information.

Figure 10:
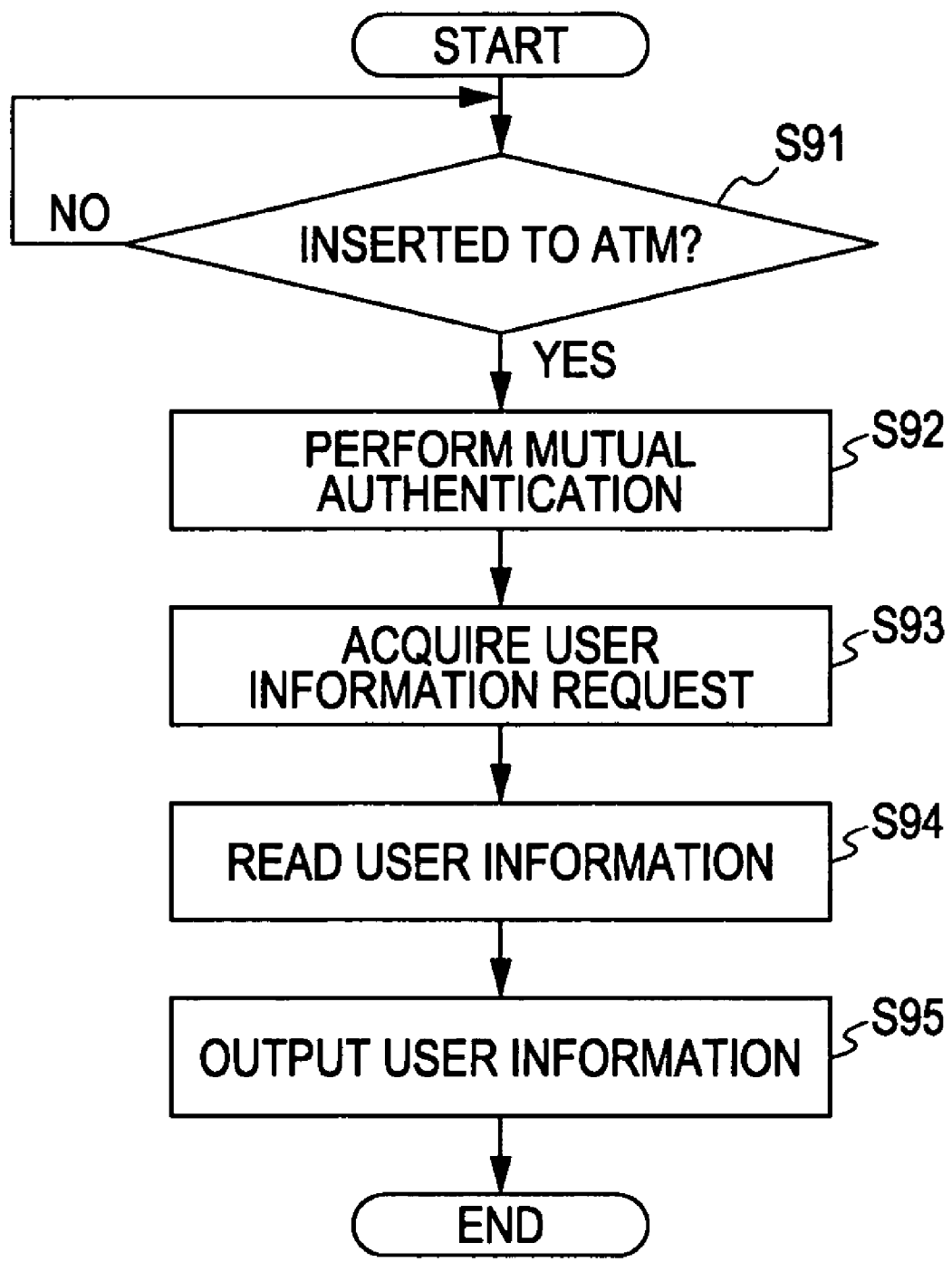
FIG. 10 is a flowchart illustrating user authentication processing performed in an IC card.

Referring now to the flowchart of FIG. 10, a processing procedure for user authentication performed by the IC card 11 will be described.

At STEP S91, the CPU 31 determines if the IC card 11 has been inserted into the ATM 12. For example, the CPU 31 determines whether or not the IC card 11 is inserted into the ATM 12 by determining whether or not the contact interface 35 contacts to the ATM 12 (the contact terminal of the reader/writer 51).

If, in STEP S91, it is determined that the IC card 11 has not inserted to the ATM 12, the processing procedure returns to STEP S91, and processing described above is repeated. Specifically, the IC card 11 remains in a standby state until it is inserted into a predetermined insertion portion of the ATM 12.

On the other hand, if, in STEP S91, it is determined that the IC card 11 has been inserted into the ATM 12, the processing procedure proceeds to STEP S92. AT STEP S92, the CPU 31 performs mutual authentication with the ATM 12. For example, in STEP S92, the CPU 31 performs mutual authentication with the ATM 12 which allow the ATM 12 to access the user setting information and the biometric information stored in the storage 34 (for example, the mutual authentication 1 and mutual authentication 2 in FIG. 5). The detailed description of this mutual authentication between the IC card 11 and the ATM 12 is provided with reference to the sequence diagram of FIG. 5 (STEPs S1, S12, S22, and S23), and a description thereof will be omitted.

At STEP S93, the contact interface 35 acquires a user information request input from the ATM 12 (the contact terminal of the reader/writer 51) held in contact. The contact interface 35 then provides the acquired user information requests to the CPU 31.

At STEP S94, the CPU 31 reads the user information from the storage 34 on the basis of the user information request provided by the contact interface 35 and then transmits the read user information to the contact interface 35. For example, in STEP S94, the CPU 31 reads the user information (the user setting information and the biometric information) from the storage 34 on the basis of the user information request provided by the contact interface 35. Then, the CPU 31 transmits the read user setting information and the biometric information to the contact interface 35.

At STEP S95, the contact interface 35 outputs the user information transmitted by the CPU 31 to the ATM 12, and then the processing procedure is terminated. For example, in STEP S95, the contact interface 35 outputs to the ATM 12 the user setting information and the biometric information transmitted by the CPU 31.

Figure 11:
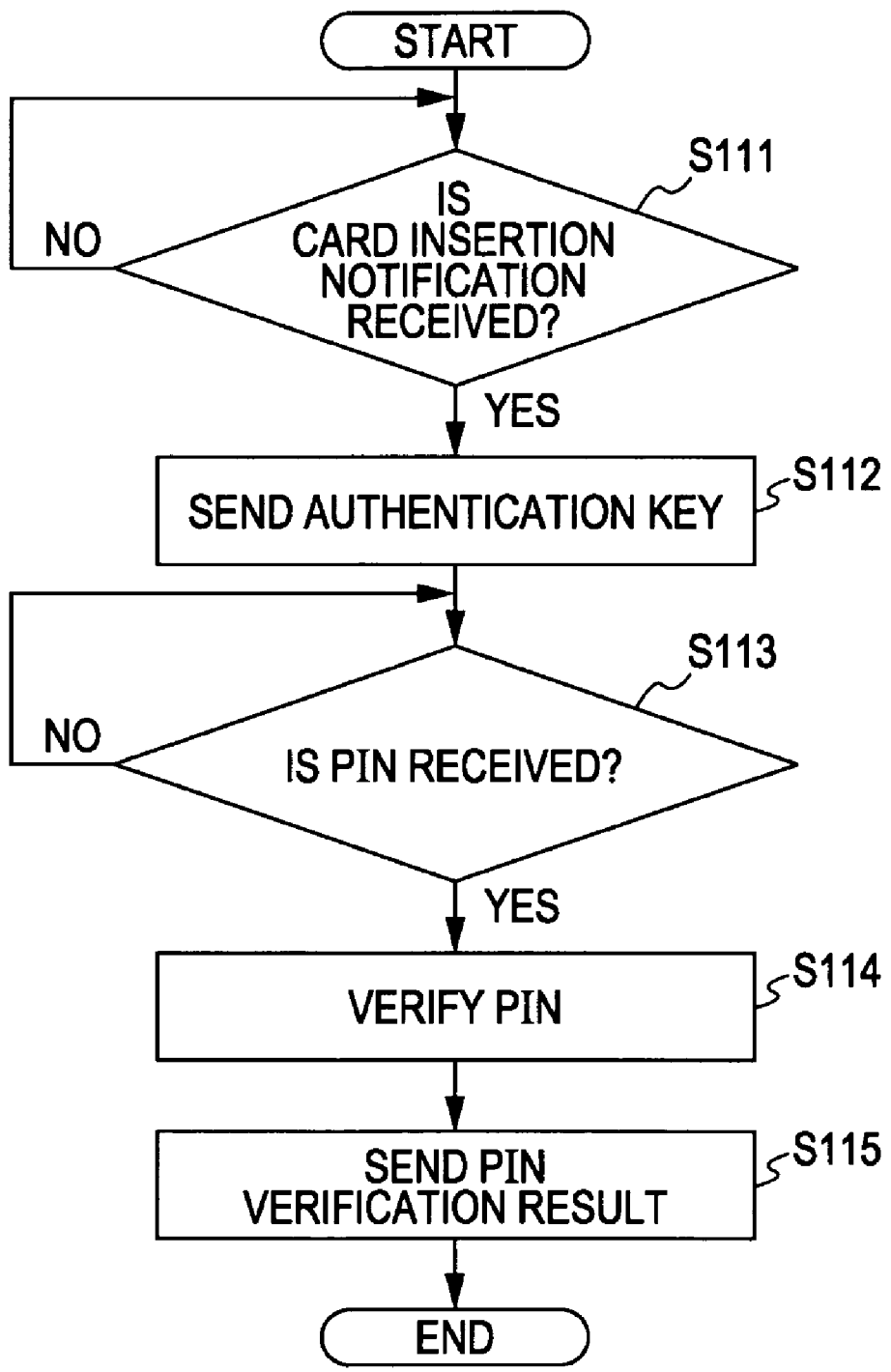
FIG. 11 is a flowchart illustrating user authentication processing performed in a host computer.

Subsequently, referring to the flowchart of FIG. 11, processing procedure for user authentication performed by the host computer 14 will be described.

At STEP S111, the CPU 111 determines whether or not a card insertion notification has been received from the ATM 12 via the communication network 13.

If, in STEP S111, it is determined that the card insertion notification has not been received, the processing procedure returns to STEP S111, and the processing described above is repeated. Specifically, the host computer 14 waits until the card insertion notification is sent from the ATM 12.

On the other hand, if, in STEP S111, it is determined that a card insertion notification has been received, the processing procedure proceeds to STEP S112. At STEP S112, the CPU 111 generates an authentication key and provides the generated authentication key to the communication section 109. The communication section 109 transmits the authentication key provided by the CPU 111 to the ATM 12 via the communication network 13.

At STEP S113, the CPU 111 determines whether or not a PIN has been received from the ATM 12 via the communication network 13.

If, in STEP S113, it is determined the PIN has not been received, the processing procedure returns to STEP S113, and the processing described above is repeated. Specifically, the host computer waits until the PIN is transmitted from the ATM 12.

On the other hand, if, in STEP S113, it is determined that the PIN has been received, the processing procedure proceeds to STEP S114. At STEP S114, the CPU 111 executes processing of PIN verification. The CPU 11 generates a PIN verification result on the basis of a result obtained from the PIN verification processing and provides the generated PIN verification result to the communication section 109. For example, in STEP S114, when the PIN is determined to be valid by PIN verification processing, the CPU 111 generates a PIN verification result indicative of the validity of the PIN and provides the generated PIN verification result to the communication section 109.

At STEP S115, the communication section 109 sends the PIN verification result provided by the CPU 111 to the ATM 12 via the communication network 13. For example, in STEP S115, the communication section 109 sends a PIN verification result indicative of the validity of the PIN provided by the CPU 111 to the ATM 12 via the communication network 13.

As described above, according to an embodiment of the present invention, a user is allowed to input his or her biometric information and a PIN after he or she checks user information (user setting information) displayed on a screen, which is set by the user. This prevents the user from inputting his or her biometric information or PIN without caution, thus preventing leakage of his or her personal information even if the ATM 12 is a counterfeit.

In addition, the user is allowed to input his or her biometric information or PIN after he or she determines whether or not the ATM 12 is reliable on the basis of a result of mutual authentication performed between the IC card 11 and the ATM 12. This enables the user to input his or her biometric information or PIN without fear of leakage of personal information and also prevents theft of the personal information.

In the example described above, a case is described where the IC card 11 is a contact IC card. However, the present embodiment is not limited to the case, and the IC card 11 can also be applied as a non-contact IC card.

The processing procedures described above can be executed by hardware as well as by software. When the processing procedures are executed by software, a program constituting the software is installed from a recording medium to a computer incorporated in dedicated hardware or a general purpose personal computer capable of executing various functions by installing various programs.

This recording medium may be configured as a package medium such as, as shown in FIG. 3, the magnetic disc 81 (including a flexible disk), the optical disc 82 (including a CD-ROM (Compact Disc-read Only memory)), the a magneto-optical disk 83 (including an MD™), or the semiconductor memory 84 which has the program recorded thereon or therein and is distributed for the purpose of providing the program to a user separately from a computer, or as a ROM (not shown) or the like which has the program recorded there in or thereon and is provided to a user in a form of being incorporated in a computer or the like.

In addition, the program serves to execute the above processing procedure may be installed in a computer through a wire communication medium or a wireless communication medium such as a local area network, the Internet, or digital satellite broadcasting using an interface such as a router or a modem as necessary.

It is noted that, in the present specification, the steps which describe the program recorded in or on a recording medium may be but need not necessarily be processed in a time series in the order as described, and includes processing which is executed parallelly or individually with out being processed in a time series.

Further, in the present specification, the term "system" is used to represent an entire apparatus composed of a plurality of apparatuses.

It should be understood that changes and modifications may be made to an embodiment of the present invention within a scope that does not deviate from the gist of the present invention.

What is claimed is:

1. An information processing system comprising a first information processing apparatus and a second information processing apparatus:

wherein the first information processing apparatus includes means for storing setting information arbitrarily set by a user, and wherein the second information processing apparatus includes means for acquiring the setting information stored in the first information processing apparatus, means for controlling display of the acquired setting information on a screen, means for, when the setting information displayed on the screen is indicated to be valid by an operation performed by the user, authenticating whether or not the user is valid, and means for, when the user has been authenticated to be valid, executing a processing operated by the user wherein, when the first information processing apparatus and the second information processing apparatus have been authenticated to be valid with respect to each other by mutual authentication, the second information processing apparatus acquires the setting information from the first information processing apparatus.

2. An information processing apparatus comprising:

acquiring means for acquiring setting information arbitrarily set by a user and stored in another apparatus;

means for controlling display of the acquired setting information on a screen;

means for, when the setting information displayed on the screen is indicated to be valid by an operation performed by the user, authenticating whether or not the user is valid; and means for, when the user has been authenticated to be valid, executing a processing operated by the user, wherein, when the information processing apparatus and the other apparatus have been authenticated to be valid with respect to each other by mutual authentication, the acquiring means acquires the setting information from the other apparatus.

3. The information processing apparatus of claim 2, further comprising a first receiving means for, when the setting information displayed on the screen is indicated to be valid by an operation of the user, receiving input of first biometric information from the user, wherein the acquiring means acquires second biometric information of the user stored in advance in the other apparatus, and wherein the authenticating means authenticates whether or not the user is valid on the basis of the received first biometric information and the acquired second biometric information.

4. The information processing apparatus of claim 2, further comprising a second receiving means for, when the setting information displayed on the screen is indicated to be valid by an operation of the user, receiving input of a personal identification number from the user, wherein the authenticating means authenticates whether or not the user is valid on the basis of a result of verification of the received personal identification number.

5. An information processing method implemented by an information processing apparatus, said information processing method comprising the steps of:

acquiring from another apparatus, when the information processing apparatus and the other apparatus have been authenticated to be valid with respect to each other by mutual authentication, setting information arbitrarily set by a user and stored in the other apparatus;

controlling display of the acquired setting information on a screen;

authenticating whether or not the user is valid when the setting information displayed on the screen is indicated to be valid by an operation performed by the user; and executing predetermined processing operated by the user when the user has been authenticated to be valid.

6. A non-transitory computer-readable-medium including computer-executable instructions tangibly embodied thereon, the instructions being executable to perform operations comprising:

acquiring from another apparatus, when the information processing apparatus and the other apparatus have been authenticated to be valid with respect to each other by mutual authentication, setting information arbitrarily set by a user and stored in the other apparatus;

controlling display of the acquired setting information on a screen;

authenticating whether or not the user is valid when the setting information displayed on the screen is indicated to be valid by an operation performed by the user; and executing predetermined processing operated by the user when the user has been authenticated to be valid.

7. An information processing apparatus comprising:

an acquisition unit acquiring setting information arbitrarily set by a user and stored in another apparatus;

a display control unit controlling display of the acquired setting information on a screen;

an authentication unit authenticating whether or not the user is valid, when the setting information displayed on the screen is indicated to be valid by an operation performed by the user; and a processing unit executing predetermined processing operated by the user, when the user has been authenticated to be valid, wherein, when the information processing apparatus and the other apparatus have been authenticated to be valid with respect to each other by mutual authentication, the acquisition unit acquires the setting information from the other apparatus.

* * * * *